April 29, 1952     K. A. FISCHER     2,594,758
DARK FIELD COLOR FILTER WITH POLARIZING MEANS FOR MICROSCOPES
Filed Jan. 18, 1949
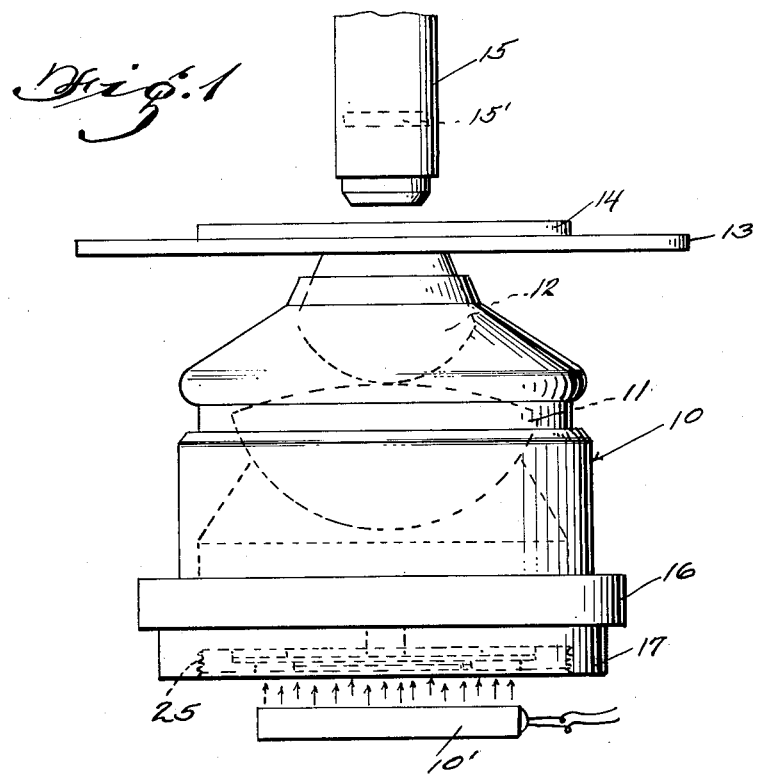
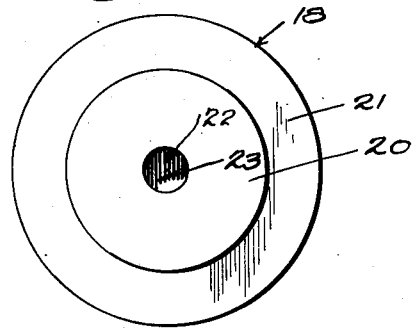
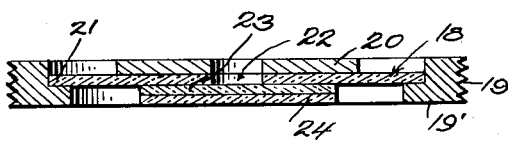
INVENTOR.
Karl A. Fischer
BY
W. J. Eccleston.
ATTORNEY Patented Apr. 29, 1952

2,594,758

UNITED STATES PATENT OFFICE 2,594,758

DARK FIELD COLOR FILTER WITH POLARIZING MEANS FOR MICROSCOPES

Karl A. Fischer, Washington, D. C.

Application January 18, 1949, Serial No. 71,522

11 Claims. (Cl. 88—40)

(Granted under the act of March 3, 1883, as amended April 30, 1928; 370 O. G. 757.)

The invention described herein, if patented, may be manufactured and used by or for the Government for governmental purposes without the payment to me of any royalty thereon.

This invention relates to a method and apparatus for illuminating an object with a combination of polarized colored light and different or complementary nonpolarized colored light. More particularly, the invention relates to an improved microscope and filter for simultaneous dark field examination of optically active and optically inactive materials, as crystals or the like, also permitting distinction of positive and negative double refractivity.

In the field of microscopic examination it has heretofore been the practice to provide a condenser mounting with a special diaphragm, or diaphragms, of contrastingly colored openings to show the objective in a bright color against an intensely but differently colored background. By these devices of optical coloring, simultaneous discernment of optically active and inactive materials with distinction between positive and negative double refractivity cannot be determined. Further, it has been found that when polarized white light and nonpolarized colored light are utilized in the manner as specifically disclosed in my co-pending application, Serial No. 26,911, filed May 13, 1948, that although optically active objects stand out against colored inactive material, they are, in some instances, overilluminated or too bright, and the desirable effect of showing cracks and inclosures in contrasting color may be suppressed.

It is, therefore, an object of this invention to provide a microscope with dark field illumination for discernment of isotropic material and nonisotropic material with distinction between positive and negative double refractivity.

An additional object of this invention is to provide a lens and improved filter therefor for illumination of an object with polarized colored light and non-polarized colored light in combination.

It is another object of this invention to provide an improved multicolored light filtering device, using polarized colored and non-polarized colored light for simultaneous color illuminating of doubly refracting optically active and optically inactive materials in a dark field background.

It is a further object of this invention to provide an improved illumination of optically active and inactive crystals with clear discernment of positive or negative double refractivity in clear outline against a dark background, with a clear showing of their depth, cracks and edges in contrasting colors of converging colored light beams.

All the further objects and advantages of this invention will be apparent from the following description, when taken in conjunction with the following drawings, wherein:

Figure 1 is a front elevation of a microscope arrangement;

Figure 2 is a cross-sectional view illustrating an embodiment of my improved filter; and Figure 3 is a top plan view of Figure 2.

Referring to the drawings, a conventional microscope condenser mounting 10 is diagrammatically illustrated for holding lenses 11 and 12, which direct light to an object on the slide 13 under cover glass 14 and to the objective lens piece 15 which contains an analyzer foil 15'. Beneath the lens 11 the condenser mounting 10 carries the usual diaphragm 16 and also the usual support or holder 17 for insertion of my improved filter 18. The filter 18, as illustrated, may be held within the support 17 by holding-ring 19, mounted as described herein, or by other suitable and conventional holding means as desired. Such means, for example, may be an adjustable mounting in the nature of that disclosed by E. S. Bissell in Patent Number 2,083,820 or Roesch Patent Number 2,105,671.

The filter 18 is an annular member, formed of non-transparent diaphragm 20 secured to transparent colored foil 21, through both of which is provided a central opening 22. Positioned or secured beneath the opening 22 is a polarizing film of sheet material 23 or other polarizing body and a colored foil 24. The colored foil 24 is positioned intermediate of the polarizing film 23 and a light source 10' of a conventional character, as generally utilized for microscopic examinations. This filter member 18 is adapted to rest upon the flange 19' of ring member 19 which is insertable within the support 17 and held therein by the obvious screw threads 25, with polarizing film 23 in crossed position to analyzer film 15'.

For purposes of illustration, in the filter structure as described, the colored foil 21 is red and the colored foil 24 is a transparent green or blue, thereby causing projected non-polarized red light and polarized green or blue light to pass into condensers 11 and 12 to converge upon an object supported by plate 13. The effect produced upon an object, as paraffin crystals or the like, is to obtain a distinct picture of active or nonisotropic and inactive or isotropic crystals in the colors of the polarized and unpolarized lights respectively on a perfectly dark background. If, in addition, a first order red plate (also called "gypsum plate") is used the active crystals stand out in blue-green or in yellow-green, according to their positive or negative double refractivity. Further, the converging light beams show edges and inactive material in bright red.

The condenser lens system 11, 12 is positioned intermediate the analyzer 15' on the one hand and the diaphragm and contrasting non-polarizing and polarizing filters in retaining ring 19 on the other hand; all of the foregoing optical members are aligned on the same optical axis.

In the apparatus described, although polarizing prisms are not excluded, the use of polarizing foils is advantageous in that these foils do not polarize the long wave red light components which causes the purple color between crossed foils. The green or blue filter for the central polarized beam eliminates or reduces this long wave component and the remaining wave lengths are well polarized and give a dark background.

As indicated, a blue foil may be substituted for the green foil 24 for use with a red foil 21. The foils may not be reversed in color arrangement as the advantage of eliminating the non-polarized purple component of the polarized central beam would be lost. That is, a short wave central color filter is essential. For the converging non-polarized color beams other color filters as orange or amber may be substituted for the color foil 21. Further, it is evident that any color combination can be used, in the event that the central beam is fully polarized by prisms or the like.

Generally it may be indicated that an adaptation of the colored light distribution, as herein described, can also be used to control optical coloring in known procedures wherein it is evident that the position of the polarizing films to each other need not necessarily be crossed. In such instances some light from the colored central beam will enter the condensing lens directly and cause a colored background, more or less bright, according to the position of the polarizing foils. By this arrangement there is provided a convenient method of changing intensity of two converging light beams. In this respect any color combination can be utilized and red may also be utilized for the central light beam. It should be understood, however, that the effect of the colored polarized light in distinctly showing active beside inactive materials diminishes gradually as the Polaroid foils or prisms, if used, deviate from crossed position.

In accordance with the patent statutes, I have described in detail what I now consider to be the preferred form of the inventon, but it will be obvious that various minor changes may be made in the structural details without departing from the spirit of the invention; and it is intended that all such changes be included within the scope of the appended claims.

I claim:

1. A composite light filter structure comprising a centrally apertured opaque annular diaphragm, an annular transparent non-polarizing color filter having a central aperture and concentric with said opaque annular diaphragm, the effective area of said annular color filter being contiguous to said opaque annular diaphragm, and a circular transparent filter of a contrasting color aligned with the central aperture of said opaque annular diaphragm, said circular filter including a light polarizing means and the effective area of said circular filter being out of register with the effective area of said annular non-polarizing color filter, said circular filter and the central apertures of said opaque annular diaphragm and of said annular non-polarizing color filter being aligned on the same optical axis; whereby colored non-polarized light and contrastingly colored polarized light may be separately and simultaneously transmitted through a condenser lens onto a microscope dark field and whereby optically active and inactive material may be simultaneously observed in contrasting colors in said dark field.

2. A composite light filter structure comprising a centrally apertured opaque annular diaphragm, an annular transparent non-polarizing color filter having a central aperture and concentric with said opaque diaphragm, the color of said non-polarizing filter having a wave length exceeding the wave length of green and the effective area of said annular color filter being contiguous to said opaque annular diaphragm, and a circular transparent filter of a contrasting color having a short wave length not exceeding the wave length of green, said circular filter being aligned with the central aperture of said opaque annular diaphragm and including light polarizing means, and the effective area of said circular filter being out of register with the effective area of said annular non-polarizing color filter, said circular filter and the central apertures of said opaque annular diaphragm and of said annular non-polarizing color filter being aligned on the same optical axis; whereby colored non-polarized light and contrastingly colored polarized light may be separately and simultaneously transmitted through a condenser lens onto a microscope dark field and whereby optically active and inactive material may be simultaneously observed in contrasting colors in said dark field.

3. A composite light filter structure according to claim 2, wherein the color of said annular non-polarizing color filter is red.

4. A composite light filter structure according to claim 2, wherein the color of said circular filter is blue.

5. A composite light filter structure according to claim 2, wherein the color of said circular filter is green.

6. A composite light filter structure comprising a centrally apertured opaque annular diaphragm and a centrally apertured annular transparent non-polarizing color filter surrounding said diaphragm, the effective area of said annular filter being contiguous to the outer periphery of said opaque annular diaphragm, and a circular transparent filter of a contrasting color aligned with the central aperture of said opaque annular diaphragm, said circular filter including light polarizing means and the effective area of said circular filter being out of register with the effective area of said annular non-polarizing color filter, said circular filter and the central apertures of said opaque annular diaphragm and of said annular non-polarizing color filter being aligned on the same optical axis; whereby colored non-polarized light and contrastingly colored polarized light may be separately and simultaneously transmitted through a condenser lens onto a microscope dark field and whereby optically active and inactive material may be simultaneously observed in contrasting colors in said dark field.

7. A composite light filter structure comprising a centrally apertured opaque annular diaphragm and a centrally apertured annular transparent non-polarizing color filter surrounding said diaphragm, the color of said non-polarizing filter having a wave length exceeding the wave length of green and the effective area of said annular color filter being contiguous to the outer periphery of said opaque annular diaphragm, and a circular transparent filter of a contrasting color aligned with the central aperture of said opaque annular diaphragm, said circular filter including light polarizing means and the effective area of said circular filter being out of register with the effective area of said annular non-polarizing color filter, said circular filter and the central apertures of said opaque annular diaphragm and of said annular non-polarizing color filter being aligned on the same optical axis; whereby colored non-polarized light and contrastingly colored polarized light may be separately and simultaneously transmitted through a condenser lens onto a microscope dark field and whereby optically active and inactive material may be simultaneously observed in contrasting colors in said dark field.

8. A composite light filter structure comprising a retaining ring, a centrally apertured annular light transmitting non-polarizing color filter member mounted in said retaining ring, and a centrally apertured opaque diaphragm of a lesser outer diameter than said non-polarizing color filter and a circular light transmitting filter of a contrasting color mounted on said annular non-polarizing color filter, said circular filter including light polarizing means, the diameter of said circular polarizing color filter not exceeding the diameter of said annular diaphragm, the effective areas of said diaphragm and color filters being concentric, the effective area of said circular color filter being out of register with the effective area of said annular non-polarizing color filter, and the effective area of said opaque diaphragm being an annular zone positioned between the effective areas of said circular color filter and of said annular non-polarizing color filter; whereby said composite filter structure may be unitarily mounted on a microscope in a position adjacent the condenser lens of said microscope, and whereby colored non-polarized light and contrastingly colored polarized light may be separately and simultaneously transmitted through said condenser lens onto a dark field for the simultaneous observation of optically active and inactive material in contrasting colors.

9. A composite light filter structure according to claim 8, wherein the color of said non-polarizing color filter has a wave length exceeding the wave length of green, and wherein said circular filter has a contrasting color having a short wave length not exceeding the wave length of green.

10. In combination with a microscope having a condenser lens and an analyzer aligned on an optical axis; a centrally apertured opaque annular diaphragm, an annular transparent non-polarizing color filter having a central aperture and concentric with said opaque annular diaphragm, the effective area of said annular color filter being contiguouus to said annular diaphragm, and a circular transparent filter of a contrasting color aligned with the central aperture of said opaque annular diaphragm, said circular filter including light polarizing means and the effective area of said circular filter being out of register with the effective area of said annular non-polarizing color filter, said circular filter and the central apertures of said opaque annular diaphragm and of said annular non-polarizing color filter being aligned on said optical axis, said condenser lens being positioned intermediate said analyzer on the one hand and said opaque annular diaphragm, annular non-polarizing color filter and contrasting circular color filter on the other hand; whereby colored non-polarized light and contrastingly colored polarized light are separately and simultaneously transmitted through said condenser lens onto a dark field and whereby optically active and inactive material may be simultaneously observed through said analyzer in contrasting colors in said dark field.

11. In combination with a microscope having a condenser lens and an analyzer aligned on an optical axis; a centrally apertured opaque annular diaphragm, an annular transparent non-polarizing color filter having a central aperture and concentric with said opaque annular diaphragm, the color of said non-polarizing filter having a wave length exceeding the wave length of green, the effective area of said annular color filter being contiguous to said annular diaphragm, and a circular transparent filter of a contrasting color of a short wave length not exceeding the wave length of green, said circular filter being aligned with the central aperture of said opaque annular diaphragm and including light polarizing means, the effective area of said circular filter being out of register with the effective area of said annular non-polarizing color filter, said circular filter and the central apertures of said opaque annular diaphragm and of said annular non-polarizing color filter being aligned on said optical axis, said condenser lens being positioned intermediate said analyzer on the one hand and said opaque annular diaphragm, annular non-polarizing color filter and contrasting circular color filter on the other hand; whereby colored non-polarized light and contrastingly colored polarized light are separately and simultaneously transmitted through said condenser lens onto a dark field and whereby optically active and inactive material may be simultaneously observed through said analyzer in contrasting colors in said dark field.

KARL A. FISCHER.

REFERENCES CITED

The following references are of record in the file of this patent:

UNITED STATES PATENTS

| Number | Name | Date |
| --- | --- | --- |
| 793,970 | Wanner | July 4, 1905 |
| 1,225,250 | Ingersoll | May 8, 1917 |
| 1,887,099 | Kraft | Nov. 8, 1932 |
| 2,097,762 | Heine | Nov. 2, 1937 |
| 2,105,671 | Roesch | Jan. 18, 1938 |
| 2,475,921 | Smith | July 12, 1949 |

OTHER REFERENCES

Powell, "Practical Photomicrography," article in Photo-Technique, pages 9 and 13 cited, December 1939, published by McGraw-Hill Publishing Co., New York, New York (Photocopy in Division 7).